US012658336B2

(12) United States Patent
Heibel

(10) Patent No.: US 12,658,336 B2
(45) Date of Patent: Jun. 16, 2026

(54) DEVICES, SYSTEMS, AND METHODS FOR POWER GENERATION USING IRRADIATORS AND OTHER GAMMA RAY SOURCES

(71) Applicant: Westinghouse Electric Company LLC, Cranberry Township, PA (US)

(72) Inventor: Michael D. Heibel, Broomfield, CO (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 228 days.

(21) Appl. No.: 18/547,936

(22) PCT Filed: Feb. 23, 2022

(86) PCT No.: PCT/US2022/070784
§ 371 (c)(1),
(2) Date: Aug. 25, 2023

(87) PCT Pub. No.: WO2022/183180
PCT Pub. Date: Sep. 1, 2022

(65) Prior Publication Data

US 2024/0153664 A1 May 9, 2024

Related U.S. Application Data

(60) Provisional application No. 63/153,628, filed on Feb. 25, 2021.

(51) Int. Cl.
*G21H 1/04* (2006.01)
*G21H 1/10* (2006.01)

(52) U.S. Cl.
CPC ............... *G21H 1/04* (2013.01); *G21H 1/103* (2013.01)

(58) Field of Classification Search
CPC ........... G21C 21/02; G21H 1/04; G21H 1/103
(Continued)

(56) References Cited

U.S. PATENT DOCUMENTS 2,858,459 A * 10/1958 Schwarz .................. G21H 1/04
250/493.1
4,663,115 A * 5/1987 Russell .................... G21H 1/00
136/202

(Continued)

FOREIGN PATENT DOCUMENTS

WO 2022183180 A1 9/2022

OTHER PUBLICATIONS

International Search Report and Written Opinion for corresponding International PCT Application No. PCT/US2022/070784, dated Jun. 7, 2022.

*Primary Examiner* — Burton S Mullins
(74) *Attorney, Agent, or Firm* — K&L Gates LLP

(57) ABSTRACT

Devices, systems, and methods for power generation using irradiators and other gamma ray sources are disclosed herein. In various aspects, an irradiator-based power generation device is disclosed. The power generation device can include a radiator layer configured to at least partially surround an irradiator, wherein the radiator layer comprises a radiator material configured to emit delta radiation in response to exposure to gamma radiation; an electrical insulation layer configured to surround the radiator layer, wherein the electrical insulation layer comprises an electrical insulation material configured to allow delta radiation to penetrate therethrough; and a collector layer configured to surround the electrical insulation layer, wherein the collector layer comprises a collector material configured to collect delta radiation.

20 Claims, 8 Drawing Sheets

(58) Field of Classification Search
USPC .................................. 310/304; 976/DIG. 412
See application file for complete search history.

(56) References Cited

U.S. PATENT DOCUMENTS

| | | | | |
|---|---|---|---|---|
| 9,640,290 | B2 * | 5/2017 | Heibel | G21D 3/04 |
| 10,269,463 | B2 * | 4/2019 | Choi | G21H 1/103 |
| 2019/0385757 | A1 | 12/2019 | Heibel | |
| 2019/0385758 | A1 | 12/2019 | Heibel et al. | |
| 2019/0392961 | A1 | 12/2019 | Choi et al. | |

* cited by examiner

DEVICES, SYSTEMS, AND METHODS FOR POWER GENERATION USING IRRADIATORS AND OTHER GAMMA RAY SOURCES

CROSS-REFERENCE TO RELATED APPLICATIONS

This application is a U.S. National Stage Entry under 35 U.S.C. § 371 of International Patent Application No. PCT/US2022/070784, entitled DEVICES, SYSTEMS, AND METHODS FOR POWER GENERATION USING IRRADIATORS AND OTHER GAMMA RAY SOURCES, filed Feb. 23, 2022, which claims the benefit of and priority under 35 U.S.C. § 119 (e) to U.S. Provisional Application No. 63/153,628, titled ELECTRIC POWER SUPPLY DEVICE CONSTRUCTED USING DEPLETED CO-60 SOURCES AND METHOD OF MANUFACTURING AND USING SAME, filed Feb. 25, 2021, the entire disclosures of which are hereby incorporated by reference in their entireties.

FIELD

The present disclosure is generally related to devices, systems, and methods for generating power using gamma ray sources, such as, for example, depleted cobalt-60 (Co-60) irradiators. The power generated using the devices, systems, and methods described herein can be in the form of electric power, heat, or a combination thereof.

SUMMARY

The following summary is provided to facilitate an understanding of some of the innovative features unique to the aspects disclosed herein, and is not intended to be a full description. A full appreciation of the various aspects disclosed herein can be gained by taking the entire specification, claims, and abstract as a whole.

In various aspects, an irradiator-based power generation device is disclosed. In some aspects, the irradiator-based power generation includes a radiator layer configured to at least partially surround an irradiator, wherein the radiator layer comprises a radiator material configured to emit delta radiation in response to exposure to gamma radiation; an electrical insulation layer configured to surround the radiator layer, wherein the electrical insulation layer comprises an electrical insulation material configured to allow delta radiation to penetrate therethrough; a collector layer configured to surround the electrical insulation layer, wherein the collector layer comprises a collector material configured to collect delta radiation; a positive terminal connection electrically coupled to the irradiator, the radiator layer, or a combination thereof; and a negative terminal connection electrically coupled to the collector layer.

In various aspects, an irradiator-based power generation system is disclosed. In some aspects, the irradiator-based power generation system includes a plurality of irradiator-based power generation devices. The plurality of power generation devices can each include a device radiator layer configured to at least partially surround an irradiator, wherein the device radiator layer comprises a device radiator material configured to emit delta radiation in response to exposure to gamma radiation; a device electrical insulation layer configured to surround the device radiator layer, wherein the device electrical insulation layer comprises a device electrical insulation material configured to allow delta radiation to penetrate therethrough; a device collector layer configured to surround the device electrical insulation layer, wherein the device collector layer comprises a device collector material configured to collect delta radiation: a device positive terminal connection electrically coupled to the irradiator, the device radiator layer, or a combination thereof; and a device negative terminal connection electrically coupled to the device collector layer. The irradiator-based power generation system can further include a system positive terminal connection electrically coupled to each of the device positive terminal connections of the plurality of power generation devices and a system negative terminal connection electrically coupled to each of the device negative terminal connections of the plurality of power generation devices.

In various aspects, an irradiator-based power generation system is disclosed. In some aspects, the irradiator-based power generation system includes a system radiator layer configured to at least partially surround a plurality of irradiators, wherein the system radiator layer comprises a system radiator material configured to emit delta radiation in response to exposure to gamma radiation; a system electrical insulation layer configured to surround the system radiator layer, wherein the system electrical insulation layer comprises a system electrical insulation material configured to allow the delta radiation to penetrate therethrough; a system collector layer configured to surround the system electrical insulation layer, wherein the system collector layer comprises a system collector material configured to collect delta radiation; a system positive terminal connection electrically coupled to the system radiator layer; and a system negative terminal connection electrically coupled to the system collector layer.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of any of the aspects disclosed herein.

BRIEF DESCRIPTION OF THE DRAWINGS

The various aspects described herein, together with objects and advantages thereof, may best be understood by reference to the following description, taken in conjunction with the accompanying drawings as follows.

Figure 1:
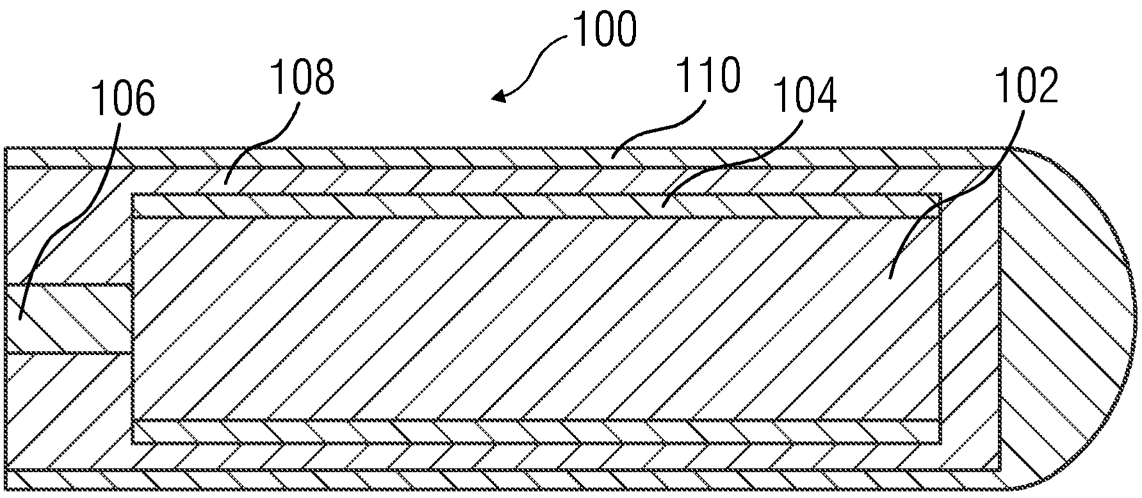
FIG. 1 is an axial cross-sectional view of a power supply element, in accordance with at least one non-limiting aspect of the present disclosure.

Corresponding reference characters indicate corresponding parts throughout the several views. The exemplifications set out herein illustrate various aspects of the present disclosure, in one form, and such exemplifications are not to be construed as limiting the scope of any of the aspects disclosed herein.

DETAILED DESCRIPTION

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims.

In the following description, like reference characters designate like or corresponding parts throughout the several views of the drawings. Also in the following description, it is to be understood that such terms as “forward,” “rearward,” “left,” “right,” “above,” “below,” “upwardly,” “downwardly,” and the like are words of convenience and are not to be construed as limiting terms.

The radiation emitted by the fuel elements of nuclear reactors can be used to produce radioactive materials. For example, cobalt-60 (sometimes referred to herein as “Co-60”) can be produced from cobalt-59 (sometimes referred to herein as “Co-59”), a non-radioactive isotope of cobalt, by exposing cobalt-59 to the radiation inside the core of a nuclear reactor. Cobalt-60 has various uses in the nuclear power industry and in other industries as well.

Figure 2:
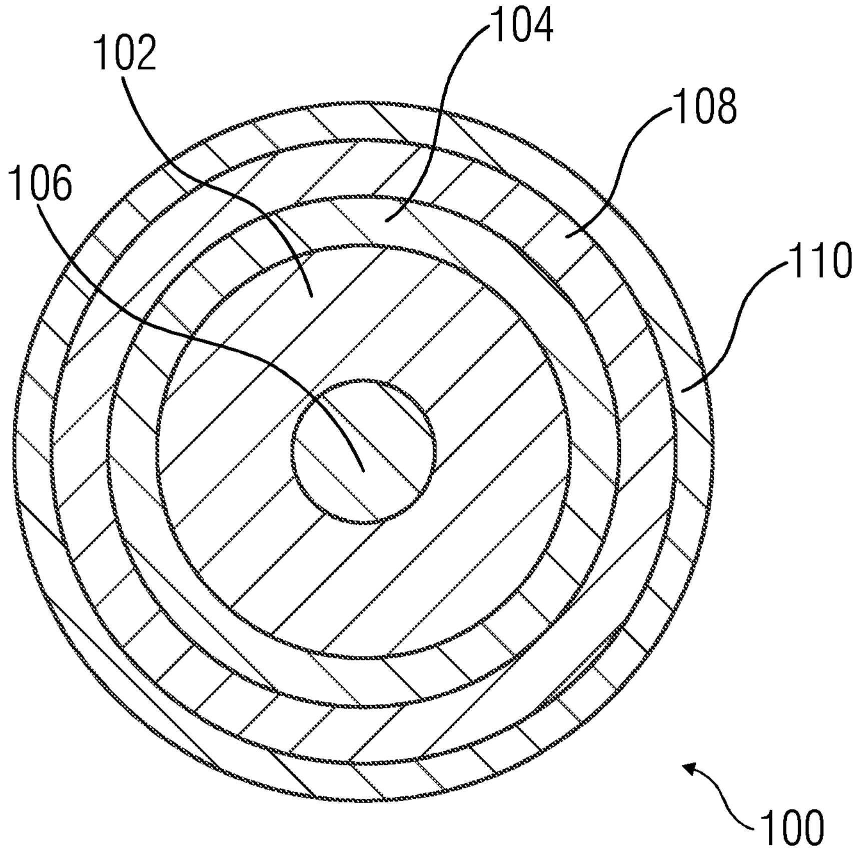
FIG. 2 is a radial cross-sectional view of the power supply element of FIG. 1, in accordance with at least one non-limiting aspect of the present disclosure.

In the context of the nuclear power industry, cobalt-60 can be created from cobalt-59 and used to generate electrical power that may be utilized to power various operations of a nuclear reactor. For example, FIGS. 1 and 2 respectively depict an axial cross-sectional view and a radial cross-sectional view of a power supply element 100 that employs cobalt-60 for power generation, in accordance with at least one non-limiting aspect of the present disclosure. The primary source of electric current generated within the power supply element are the Compton and photo-electrically scattered electrons produced in a platinum coating 104 on a hollow cobalt-59 wire 102 by the gamma radiation produced by fission and fission products inside an operating reactor core. After the power supply element 100 has been inside an operating reactor core for some relatively short period of time during a typical reactor operating cycle, the gamma and beta radiation produced by the decay of cobalt-60 that is generated when cobalt-59 absorbs a neutron will begin to produce additional contributions to the output electric current, which is conveyed to through a central electrical lead 106. Eventually, the amount of cobalt-60 produced from the cobalt-59 will be sufficient to provide the electrical current required to power various in-core instrumentation (not shown) even when the reactor is shut down or if the power supply element 100 is removed from the reactor core. Insulation 108, such as alumina insulation, may be is interposed between an outer sheath 110 and the platinum coating 104 and around the interface of the entire assembly with the outer sheath 110.

In other aspects, the operating principle described above with respect to FIGS. 1 and 2 can be achieved with other power supply element materials. Thus, the concepts described herein are not meant to be limited to the use of cobalt-59 and cobalt-60. Other materials that are initially not radioactive may be used in place of cobalt-59 to produce electrical power. The power supply element 100 may be used in all types of reactors and provide an added measure of efficiency for operating the reactors by taking advantage of the radiation emitted in the reactor core to produce electrical power. Additional details and uses related to power supply element 100 are described in U.S. Patent Publication No. 10.438,708 titled “IN-CORE INSTRUMENTATION THIMBLE ASSEMBLY,” which is incorporated by reference herein in its entirety.

Cobalt-60 may be produced by nuclear power plants for various uses outside of the nuclear power industry. For example, cobalt-60 can be used to sterilize medical equipment, to irradiate food for perseveration and sanitation purposes, and for many other purposes. Other gamma radiation-emitting isotopes such as caesium-137 (sometimes referred to herein as “Cs-137”) may similarly be produced by nuclear power plants and used as an irradiator. Thus, the term “irradiator,” as used herein, can mean any object that includes a material having radioactive isotopes emitting gamma radiation.

Because cobalt-60 and other irradiators have many uses outside of the nuclear industry, these materials may be produced by nuclear power plants for commercial purposes. These irradiators can have a radioactivity in a range of thousands of curies (Ci) when initially produced. However, the radioactivity of these irradiators decays over time (e.g., to an activity in a range of hundreds of Ci) and eventually the depleted irradiators lose their utility in some applications. As used herein, the term “depleted irradiator” can mean any irradiator that has decreased in radioactivity compared to its initial production. In some aspects, a depleted irradiator can have a radioactivity of less than 15,000 Curies, less than 4,000 Curies, less than 3,000 Curies, less than 2,000 Curies, less than 1,500 Curies, less than 1,000 Curies, less than 500 Curies, between 500 and 15,000 Curies, between 500 and 3,000 Curies, between 500 and 2,500 Curies, between 500 and 2,000 Curies, between 500 and 1,500 Curies, between 500 and 1,000 Curies, between 50 and 2,000 Curies, between 50 and 1000 Curies, about 500 Curies, about 1,000 Curies, about 1500 Curies, about 2000 Curies, about 2500 Curies, and/or between 500 and 3000 Curies.

Current regulations require depleted irradiators to be properly disposed of or stored, which can result in an extreme financial burden to irradiator producers, such as nuclear power facilities. In some cases, this cost may ultimately outweigh the commercial benefits of producing cobalt-60 and other irradiators. Thus, there is a need for devices, systems, and methods of using irradiators after they have become depleted with respect to their initial purpose. The present disclosure provides devices, systems, and methods for generating power using gamma ray sources, such as, for example, irradiators and depleted irradiators (e.g., depleted cobalt-60 irradiators).

Figure 3:
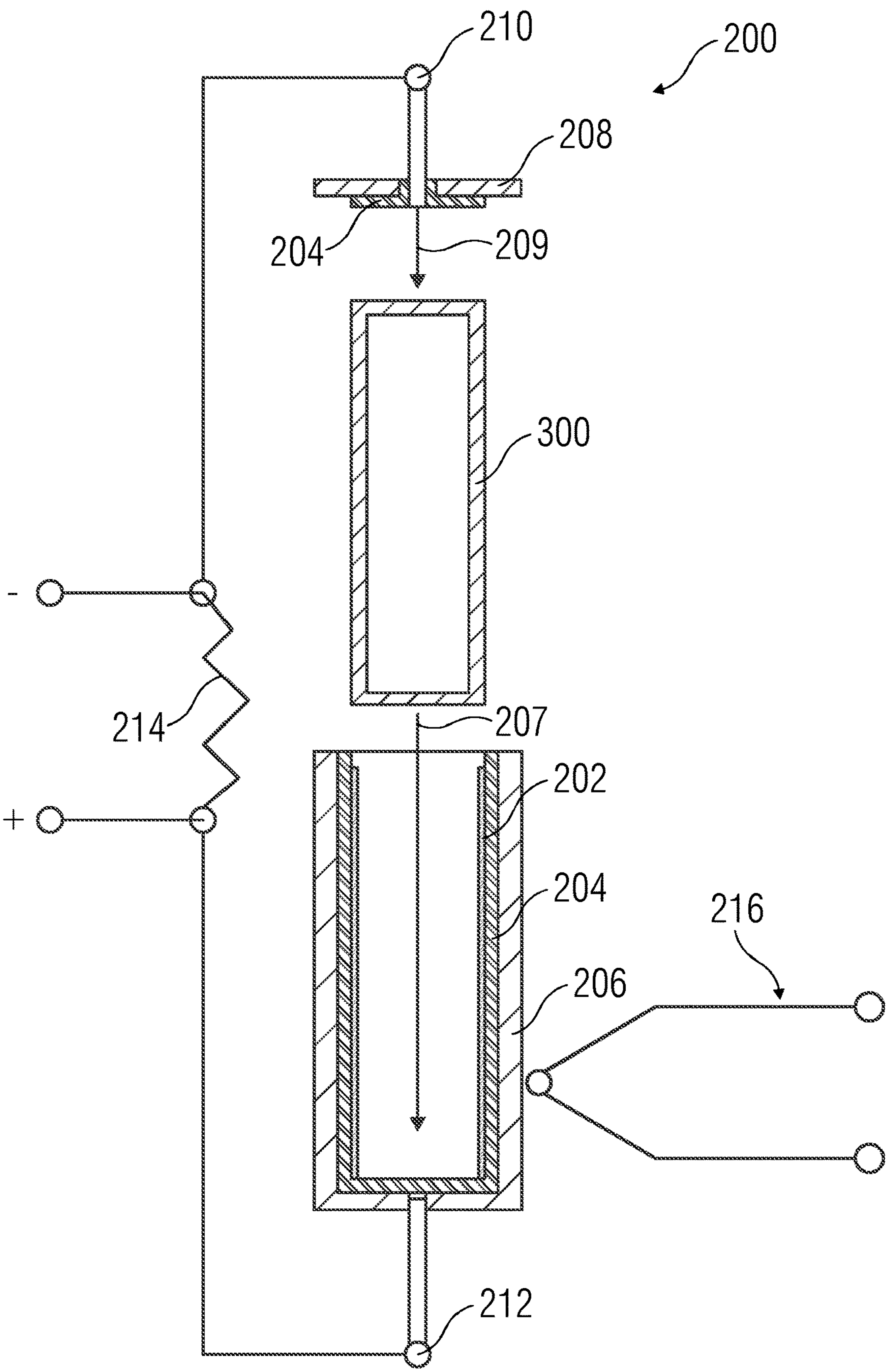
FIG. 3 is a cross-sectional schematic representation of an irradiator-based power generation device including an irradiator, in accordance with at least one non-limiting aspect of the present disclosure.

FIG. 3 depicts a cross-sectional schematic representation of an irradiator-based power generation device 200 including an irradiator 300, in accordance with at least one non-limiting aspect of the present disclosure. In some aspects, irradiator 300 can be a cobalt-60 irradiator. In other aspects, irradiator 300 can be a depleted cobalt-60 irradiator. In yet other aspects, irradiator 300 can be any irradiator source capable of emitting gamma radiation, such as caesium-137.

The power generation device 200 includes a radiator layer 202, an electrical insulation layer 204, and a collector layer 206. The irradiator 300 may be slidably inserted 207 or otherwise is positioned within the radiator layer 202. The radiator layer 202 may include a radiator layer material. In one aspect, the radiator layer material can be a high-Z material (material having a high atomic number, such as, for example, an atomic number greater than 30, such as, for example, greater than 40, greater than 50, greater than 60, or greater than 70). In another aspect, the radiator layer material can be tungsten, another high-Z material, or a combination thereof. In some aspects, the radiator layer 202 is relatively thin compared the collector layer 206. Gamma radiation emitted by the irradiator 300 can interact with the radiator layer 202 to emit delta radiation (i.e., high energy electrons). The delta radiation may be generated based on Compton and photo-electric scatting principles similar to those employed by the power supply element described above with respect to FIGS. 1 and 2.

Still referring to FIG. 3, the electrical insulation layer 204 may be in contact with and/or surround the radiator layer 202. Further, the electrical insulation layer 204 may include an electrically insulating material, such as magnesium-oxide. The electrical insulation layer 204 may be configured as a thin layer such that the delta radiation emitted by the radiator layer 202 is able to penetrate and pass through the electrical insulation layer 204.

The collector layer 206 may be in contact with and/or surround the electrical insulation layer 204. The collector layer 206 may be configured as an outer sheath that includes a material configured to collect the delta radiation that passes through the electrical insulation layer 204, such as a metallic material configured to collect the delta radiation. The delta radiation collected by the collector layer 206 causes a voltage difference between irradiator 300 and the collector layer 206.

The power generation device 200 can include a closure lid 208 that may be threaded, welded, or otherwise attached 209 to the collector layer 206. The closure lid 208 can include a material similar to that of the collector layer 206 and can be in electrical contact with the collector layer 206. The closure lid 208 includes a positive terminal connection 210 passing therethrough. The positive terminal connection 210 is in electrical contact with the irradiator 300 and insulated 204 from the closure lid 208. The power generation device can also include a negative terminal connection 212 in electrical contact with the collector layer 206. Thus, the voltage difference between the collector layer 206 and the irradiator 300 can be used to generate an electrical current determined by a load resistance 214. Thus, the power generation device 200 may be used to generate electrical power using the irradiator 300.

The delta radiation collected by the collector layer 206 may also generate heat at the collector layer 206. This heat may be harvested using a thermal harvesting connection 216. The harvested heat energy may be used to generate power using thermo-electric conversion methods.

Still referring to FIG. 3, in some aspects, the power generation device 200 may include an electrical insulation layer 204 and a collector layer 206 without the radiator layer 202. In this aspect, the irradiator 300 may be placed or otherwise secured in a tube or similar enclosure made of a thin layer of a high-Z material (not shown in FIG. 3), such as tungsten, or other materials with an atomic number greater than 30, such as, for example, greater than 40, greater than 50, greater than 60, or greater than 70. This configuration of power generation device 200 may simplify the pluming required to harvest electrical power. Further, this configuration of power generation device 200 could allow for easy replacement of the irradiator 300 when the activity of the irradiator 300 drops below useful levels.

Figure 4:
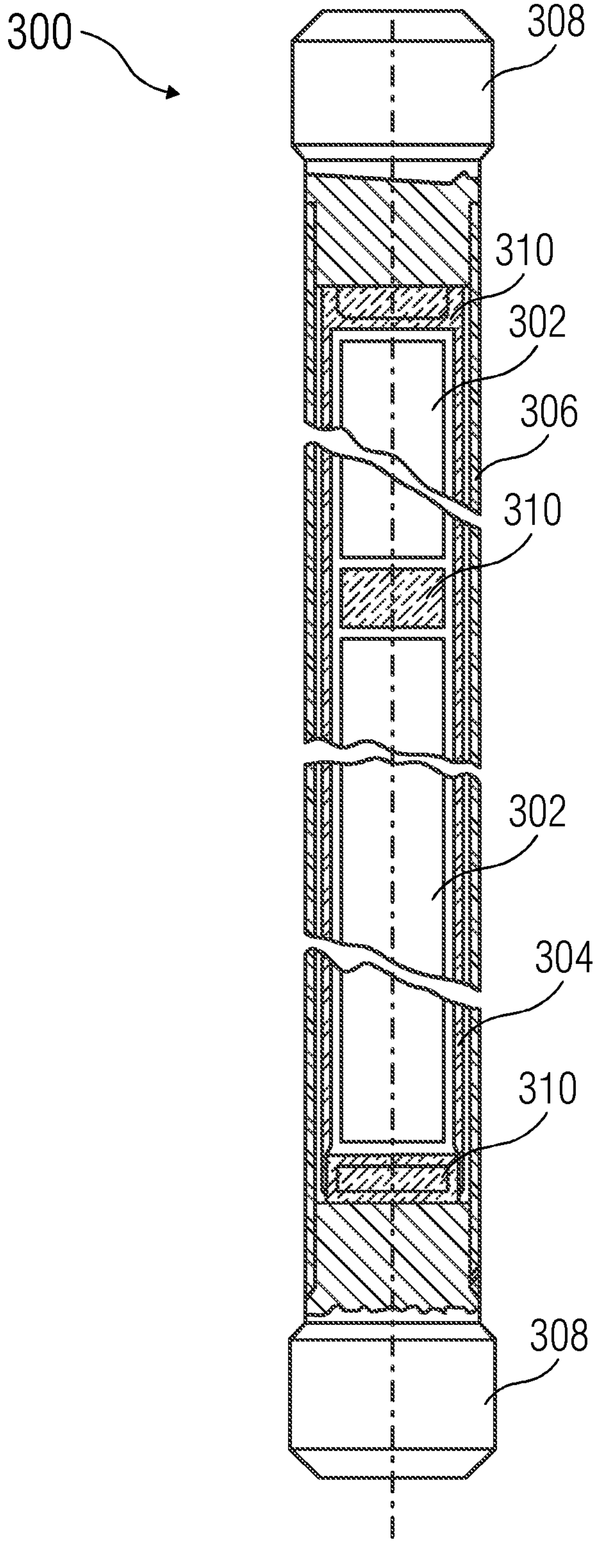
FIG. 4 is a partial cross-sectional view of an exemplary irradiator, in accordance with at least one non-limiting aspect of the present disclosure.

FIG. 4 depicts a partial cross sectional view of an exemplary irradiator 300, in accordance with at least one non-limiting aspect of the present disclosure. The irradiator 300 includes irradiator material 302. The irradiator material 302 can be any material having radioactive isotopes capable of emitting gamma radiation, such as, for example cobalt-60 or caesium-137. In some aspects, the irradiator 300 may be a depleted irradiator, such as an irradiator previously used to sterilize medical equipment, to irradiate food for perseveration and sanitation purposes, or for some other purpose. For example, the irradiator 300 may be similar to an irradiator capsule produced by Nordion. Although the irradiator 300 may be a depleted irradiator, the expected gamma activity levels of the depleted irradiators may still be many hundreds of Ci at the end of their useful life for their original purpose (e.g., medical sterilization, food irradiation, etc.). This amount of activity can still generate many milliamperes of electric current per unit length when applied in the power generation device 200 described above with respect to FIG. 3. Moreover, a plurality of power generation devices and/or irradiators may be grouped together to achieve a desired electrical output using power generation systems 400 and/or 500, as described in more detail below with respect to FIGS. 6-8. In other aspects, the irradiator 300 may not be a depleted irradiator. For example, irradiator 300 may be produced by a nuclear power facility and directly used in the power generation devices and systems described herein.

Still referring to FIG. 4, irradiator 300 can include an inner capsule 304 configured to contain the irradiated material 302. Further, irradiator 300 can include a body tube 306 and end caps surrounding the inner capsule 304. In some aspects, the irradiator 300 may also include one or more spacers 310 between any of the irradiated material 302, inner capsule 304, and/or end caps 308 as needed to secure the irradiated material 302.

Figure 5:
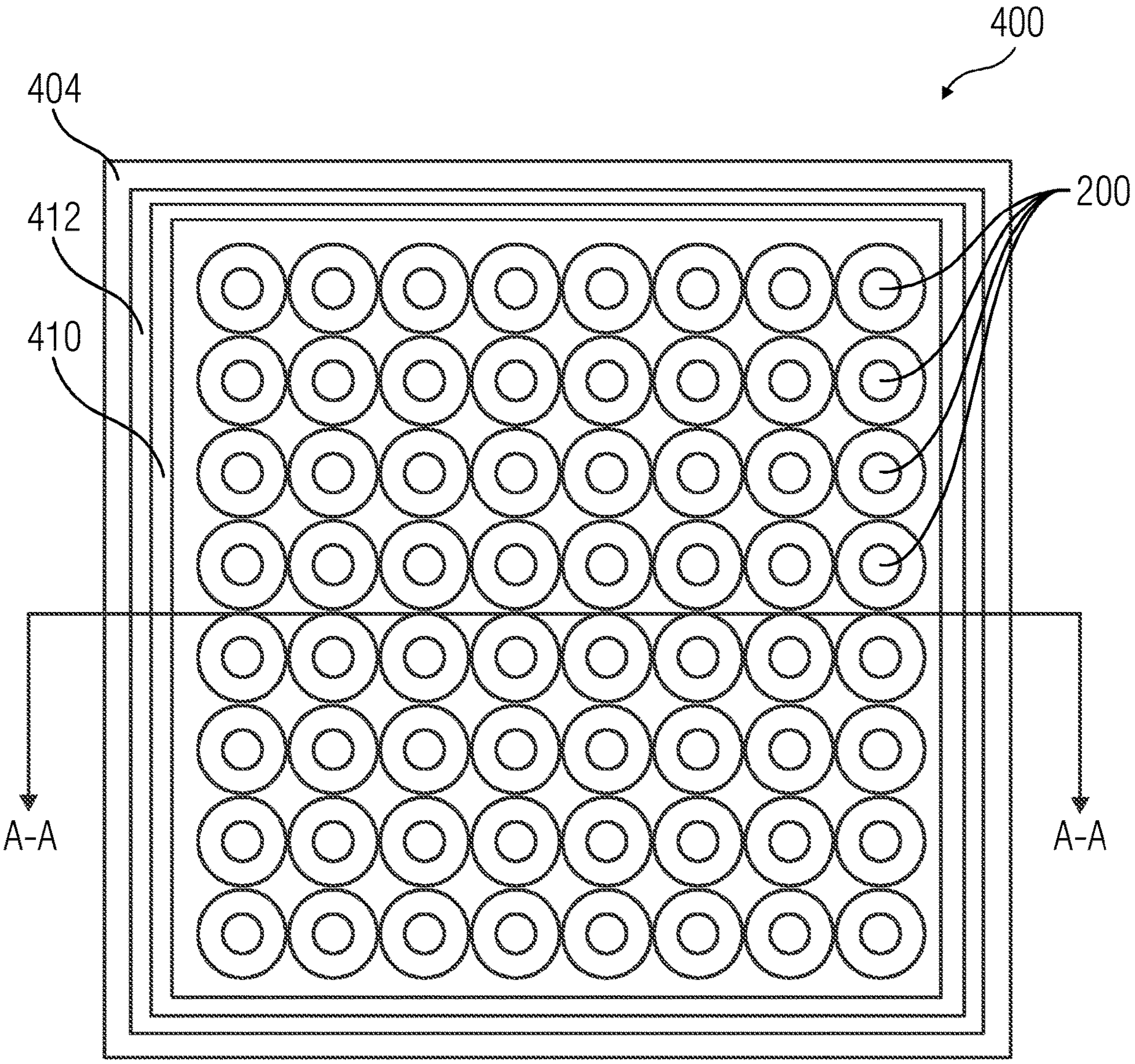
FIG. 5 is a plan view of a schematic representation of an irradiator-based power generation system including a plurality of irradiator-based power generation devices, in accordance with at least one non-limiting aspect of the present disclosure.
Figure 6:
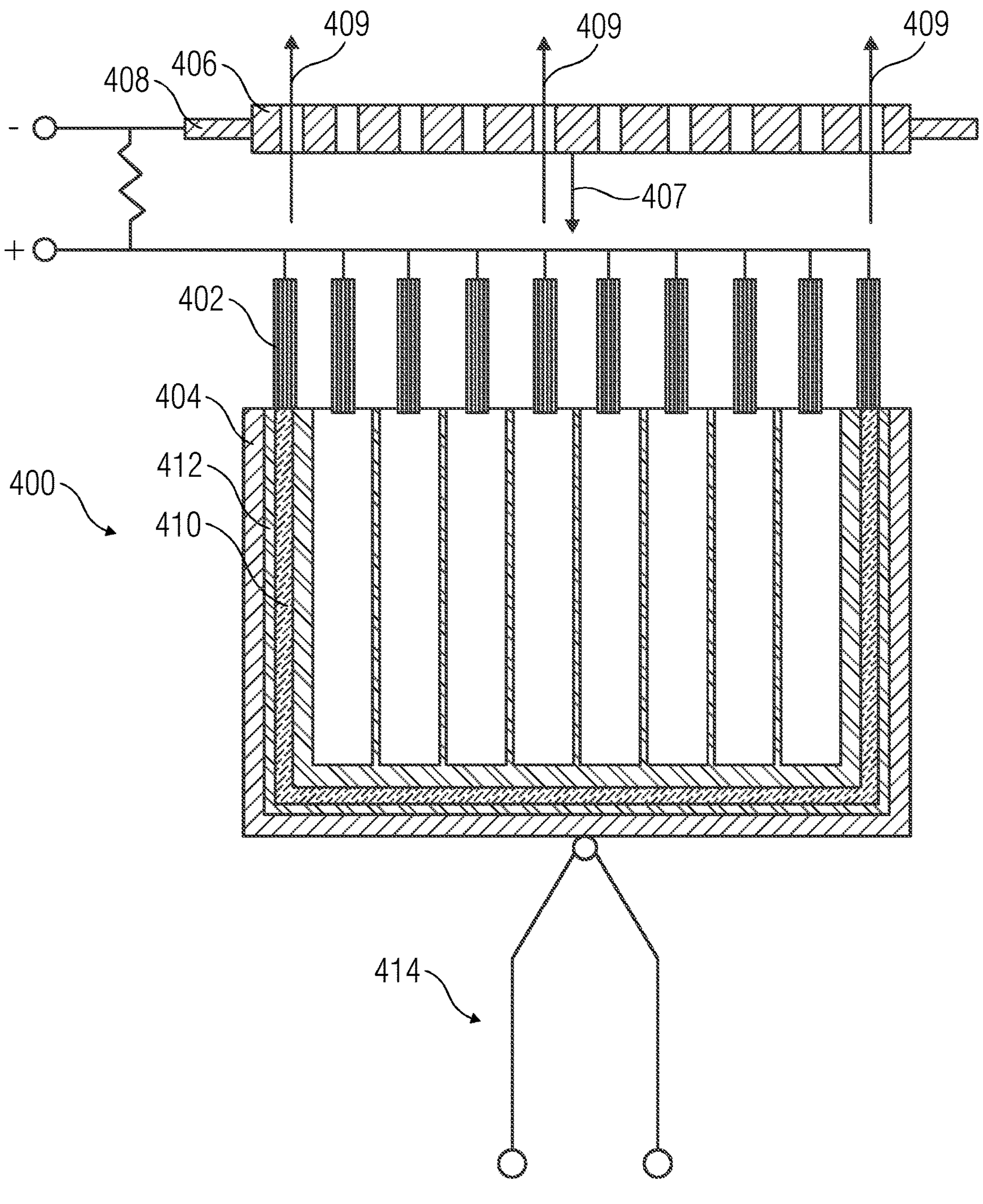
FIG. 6 is a cross-sectional view of the schematic representation of an irradiator-based power generation system of FIG. 5., in accordance with at least one non-limiting aspect of the present disclosure.

FIGS. 5 and 6 depict a schematic representation of an irradiator-based power generation system 400 including a plurality of irradiator-based power generation devices 200, in accordance with at least one non-limiting aspect of the present disclosure. FIG. 5 depicts the power generation system 400 in plan view and FIG. 6 depicts the power generation system 400 at cross section A-A, Referring primarily to FIGS. 5 and 6, and also to FIG. 3, power generation system 400 groups together a plurality of irradiator-based power generation devices 200 to obtain a desired power level. The power generation system 400 includes an array of power generation devices 200, wherein each of the positive terminal connections 210 of the power generation devices 200 are coupled to a positive terminal connection 402 of the power generation system 400. Although FIG. 5 depicts sixty-four (64) power generation devices 200, any number of power generation devices 200 may be used in the power generation system 400. The power generation system 400 may also include a collector layer 404 and a closure lid 406 configured to be placed on or otherwise attached 407 to the collector layer 404. Attaching 407 the closure lid 406 to the collector layer 404 may cause positive terminal connections 402 to pass through the closure lid 406. The collector layer 404 and closure lid 406 may be a similar material to the collector layer 206 material described above. The collector layer 404 may be electrically coupled to the closure lid. Further, the negative terminal connections 212 of the power generation devices 200 may be electrically coupled to the collector layer 404 and/or the closure lid 406. The closure lid 406 may include a negative terminal connection 408. Moreover, the positive terminal connections 402 may be electrically insulated from the closure lid 406. Thus, the power generation system 400 may be configured to electrically connect each of the power generation devices 200 in parallel achieve an increased power level compared a power level of each of the individual power generation devices 200.

Still referring primarily to FIGS. 5 and 6, and also to FIG. 3, the power generation system 400 may include a radiator layer 410 and an electrical insulation layer 412. The radiator layer 410 and electrical insulation layer 412 can be similar to the radiator layer 202 and electrical insulation layer 204, respectively. Thus, gamma radiation that may escape any of the individual power generation devices 200 can cause the emission of delta radiation by the radiator layer 410. The delta radiation emitted by the radiator layer 410 penetrates and passes through the electrical insulation layer 412 and is collected by the collector layer 404. This causes a voltage difference between the collector layer 404 and the radiator layer 410. Thus, the power generation system 400 may include a positive terminal connector 402 coupled to the radiator layer to generate additional power using gamma radiation that escapes the individual power generation devices 200.

The delta radiation collected by the collector layer 404 may also generate heat at the collector layer 404. This heat may be harvested using a thermal harvesting connection 414 and be used to generate power using thermo-electric conversion methods.

Figure 7:
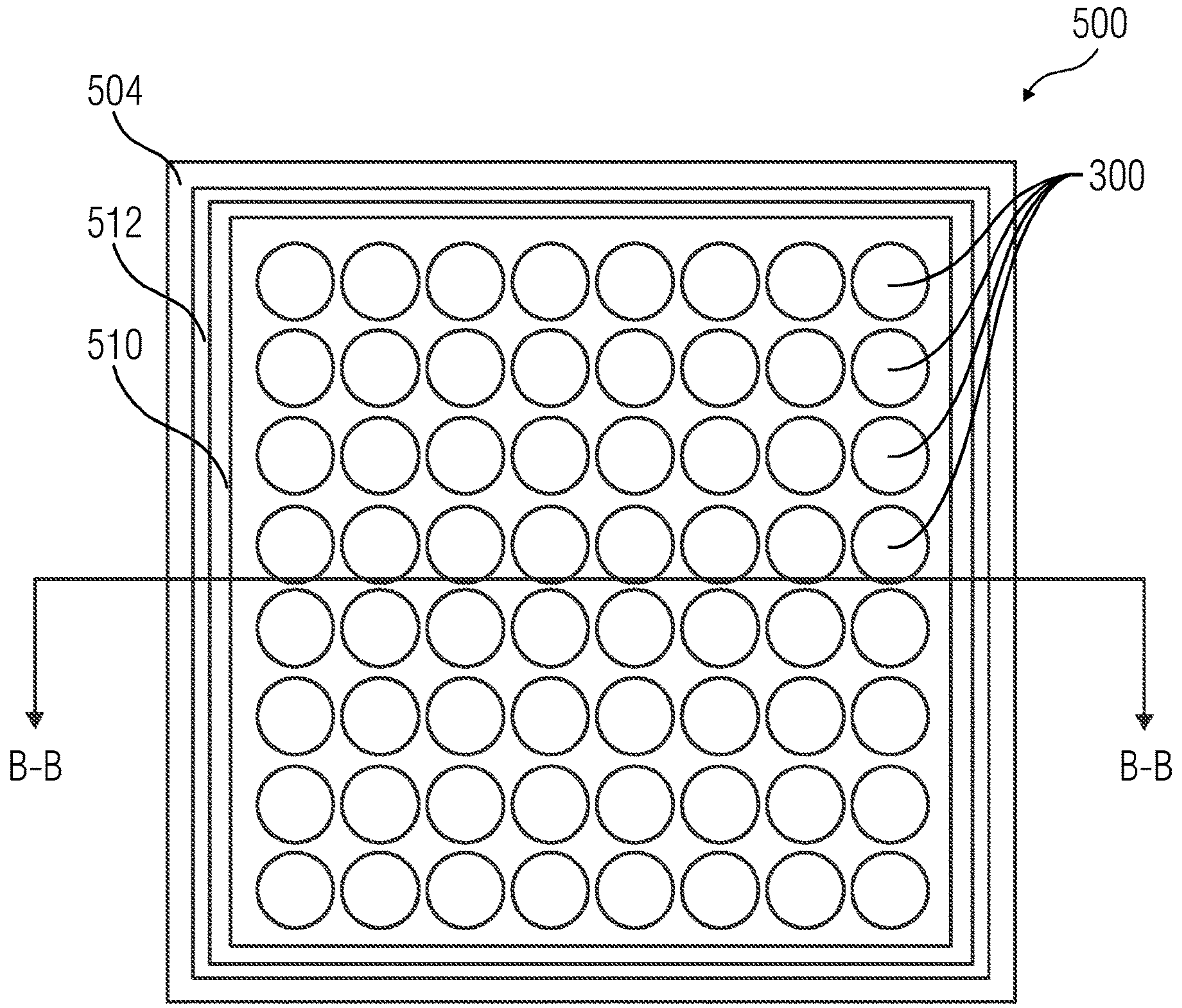
FIG. 7 is a plan view of a schematic representation of an irradiator-based power generation system including a plurality of irradiator sources, in accordance with at least one non-limiting aspect of the present disclosure.
Figure 8:
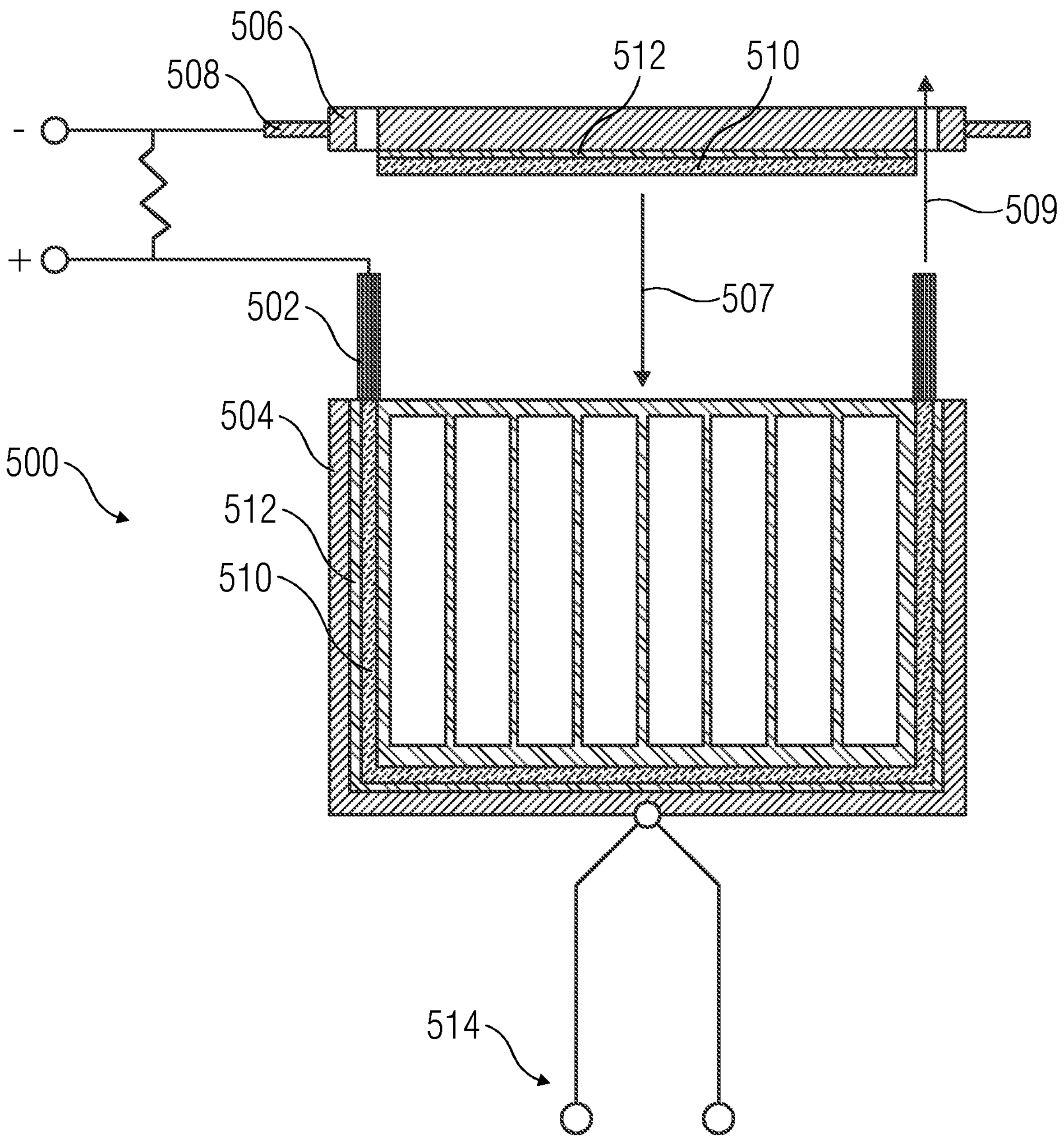
FIG. 8 is a cross-sectional view of the schematic representation of an irradiator-based power generation system of FIG. 7, in accordance with at least one non-limiting aspect of the present disclosure.

FIGS. 7 and 8 depict a schematic representation of an irradiator-based power generation system 500 including a plurality of irradiators 300, in accordance with at least one non-limiting aspect of the present disclosure. FIG. 7 depicts the power generation system 500 in plan view and FIG. 6 depicts the power generation system 500 at cross section B-B. Referring primarily to FIGS. 7 and 8, and also to FIG. 4, power generation system 500 groups together a plurality of irradiators 300 to generate power. Although FIGS. 7 and 8 depict sixty-four (64) irradiators, any number of irradiators 300 may be used in the power generation system 500. The irradiators 300 in power generation system 500 are contained within a radiator layer 510, an electrical insulation layer 512, and a collector layer 504. The radiator layer 510, electrical insulation layer 512, and collector layer 504 can be respectively similar to the radiator layer 202, electrical insulation layer 204, and collector layer 206 described above with respect to FIG. 3. The power generation system 500 can include a closure lid 506 configured to be placed on or otherwise attached 507 to the collector layer 504. The closure lid 506 can be made of a material similar to the collector layer 504. Thus, gamma radiation emitted by irradiators 300 can cause the emission of delta radiation by the radiator layer 510. The delta radiation emitted by the radiator layer 510 passes through the electrical insulation layer 512 and is collected by the collector layer 504. This causes a voltage difference between the collector layer 504 and the radiator layer 510.

Still referring to FIGS. 7 and 8, the power generation system 500 can include a positive terminal connector 502 coupled to the radiator layer 510 and a negative terminal connector 508 coupled to the closure lid 506. Similar to the positive terminal connectors 402 described above with respect to the power generation system 400 of FIGS. 5 and 6, the positive terminal connectors 502 may pass through 509 the closure lid 506 and may be electrically insulated from the closure lid 506. Thus, the power generation system 500 may be configured to generate power from the gamma radiation emitted by the individual irradiators.

The delta radiation collected by the collector layer 504 may also generate heat at the collector layer 504. This heat may be harvested using a thermal harvesting connection 514 and be used to generate power using thermo-electric conversion methods.

Exemplary power production capabilities of various power generation devices and systems described herein are provided in the examples below:

Example 1

The typical range of the radioactivity of depleted cobalt-60 irradiators is between 500-2000 Curies (Ci). For the convenience of the calculation, it was assumed that the source activity is about 1000 Ci. Data provided by Mirion IST indicates that the cobalt-60 gamma sensitivity of a Tungsten self-powered detector (SPD) is equal to or more than $9\times10^{-18}$ A/(R/hr)/mm$^2$. For the convenience of this calculation, it was assumed that the sensitivity of the Tungsten layer (SPD) is about $9\times10^{18}$ A/(R/hr)/mm$^2$. In order to calculate the current that will be generated by a device similar to the power generation device 200 described above, the gamma ($\gamma$) dose rate (R/hr) associated with the source of the cobalt-60 irradiator is needed. The radiation shielding calculation tool RadPro was used calculate the dose rate of the cobalt-60 gamma ($\gamma$) corresponding to 1000 Ci activity an assumed distance of 1 mm and distance: 1000 Ci of Co-60 @0.1 cm→Dose Rate (R)=$1.3\times10^{11}$R/hr The calculation also requires the surface area of the Tungsten layer (an exemplary radiator layer 202) surrounding the cobalt-60 irradiator to calculate the total current. It was assumed the surface area of the Tungsten layer surrounding the Co-60 source is the same as the surface area of the irradiator over the length containing the Co-60 pellets. The surface area of the Tungsten layer surrounding the Co-60 source is calculated as: $A=\pi\cdot D\cdot L=\pi\cdot(9.65)\cdot(406)=12308.4\ \text{mm}^2$ Using the sensitivity information for a Tungsten SPD, the expected electron current ($1_y$) can be calculated using the relationship: $1_y=(9\times10^{18})\ (1.3\times10^{11})\ (123084)=0.0144$ A/device [1000 Ci].

If R is adjusted to operate at 125 V, the corresponding power (P) is calculated as: $P=V\cdot I=(125)\ (0.0144)=1.8$ W.

Example 2

Therefore, if the individual power generation devices are combined to form the power generation system as shown in FIGS. 5 and 6, using 556 encapsulated Co-60 sources operating at 125 V, it is calculated that 1 KW of electrical power can be generated. In this example, the power generation system would fit into a square structure about 25 inches on each side and about 12 inches tall.

Example 3

For the power generation system shown in FIGS. 7 and 8, where the individual cobalt-60 irradiators are not encapsulated in a power generation device, the contributions from cobalt-60 sources that are not on the outer edges of the source array may effectively lost. The dose rate to the Tungsten layer is, however, essentially the same as the dose rate delivered to the Tungsten in the encapsulated design method: $R=1.3\times10^{11}$ R/hr.

If the box in the dimensions of 25"×25"×12" is used, the effective area of the box in this example is $1.593\times10^{6}$ $mm^2$ (sides+top+bottom).

The value of electron current ($I_y$) can be calculated using the following equation: $I_y=(9\times10^{-18})\ (1.3\times10^{11})\ (1.593\times10^{6})=1.86$ A If the R is adjusted to be operated at 125 V, the corresponding power (P) is calculated as: $P=V\cdot I=(125)\ (1{,}86)=232.5$ W In summary, the encapsulated design according to Examples 1 and 2 could produce 1 KW from a 25"×25"×12" structure. For using an exemplary structure box design that includes the gamma harvesting design (similar to that of the power generation system of FIGS. 5 and 6), an additional electrical power of about 232.5 W can be obtained. If only an exemplary gamma harvesting box is used without encapsulating the cobalt-60 irradiator sources, as described in Example 3, about 232.5 W of electric power can be obtained from a 25"×25"×12" box.

Example 4

An alternate approach would be to place cobalt-60 irradiators into a tube of high-Z metallic material, such as Tungsten, and then place the tube containing the irradiator into power generation device similar to the power generation device 200 of FIG. 3 that excludes the radiator layer 202. This approach could simplify the construction of the power generation device the pluming required to harvest the electrical power. In principle, this approach could allow simple replacement of the Co-60 source core of the device when the activity drops below useful levels.

Various aspects of the power generation devices and systems described herein are set out in the following clauses.

An irradiator-based power generation device comprising: a radiator layer configured to at least partially surround an irradiator, wherein the radiator layer comprises a radiator material configured to emit delta radiation in response to exposure to gamma radiation; an electrical insulation layer configured to surround the radiator layer, wherein the electrical insulation layer comprises an electrical insulation material configured to allow delta radiation to penetrate therethrough; a collector layer configured to surround the electrical insulation layer, wherein the collector layer comprises a collector material configured to collect delta radiation; a positive terminal connection electrically coupled to the irradiator, the radiator layer, or a combination thereof; and a negative terminal connection electrically coupled to the collector layer.

The power generation device further comprising the irradiator.

The power generation device, wherein the irradiator comprises a depleted irradiator.

The power generation device, wherein the irradiator comprises cobalt-60, caesium-137, or a combination thereof.

The power generation device, wherein the radiator material comprises tungsten.

The power generation device of, wherein the electrical insulation material comprises magnesium-oxide.

The power generation device of, further comprising a thermal harvesting connection.

An irradiator-based power generation system comprising: a plurality of irradiator-based power generation devices, wherein each of the plurality of power generation devices comprise: a device radiator layer configured to at least partially surround an irradiator, wherein the device radiator layer comprises a device radiator material configured to emit delta radiation in response to exposure to gamma radiation; a device electrical insulation layer configured to surround the device radiator layer, wherein the device electrical insulation layer comprises a device electrical insulation material configured to allow delta radiation to penetrate therethrough; a device collector layer configured to surround the device electrical insulation layer, wherein the device collector layer comprises a device collector material configured to collect delta radiation; a device positive terminal connection electrically coupled to the irradiator, the device radiator layer, or a combination thereof; and a device negative terminal connection electrically coupled to the device collector layer; a system positive terminal connection electrically coupled to each of the device positive terminal connections of the plurality of power generation devices; and a system negative terminal connection electrically coupled to each of the device negative terminal connections of the plurality of power generation devices.

The power generation system, further comprising: a system radiator layer configured to at least partially surround the plurality of irradiator-based power generation devices, wherein the system radiator layer comprises a system radiator material configured to emit delta radiation in response to exposure to gamma radiation; a system electrical insulation layer configured to surround the system radiator layer, wherein the system electrical insulation layer comprises a system electrical insulation material configured to allow the delta radiation to penetrate therethrough; a system collector layer configured to surround the system electrical insulation layer, wherein the system collector layer comprises a system collector material configured to collect delta radiation, and wherein the system collector layer is electrically coupled to the system negative terminal connection.

The power generation system of any, wherein the system radiator material comprises tungsten.

The power generation system of, wherein the system electrical insulation material comprises magnesium-oxide.

The power generation system of, further comprising a system thermal harvesting connection.

The power generation system of, wherein each of the plurality of power generation devices comprise the irradiator.

The power generation system of, wherein the irradiator comprises a depleted irradiator.

The power generation system of, wherein the irradiator comprises cobalt-60, caesium-137, or a combination thereof.

An irradiator-based power generation system comprising: a system radiator layer configured to at least partially surround a plurality of irradiators, wherein the system radiator layer comprises a system radiator material configured to emit delta radiation in response to exposure to gamma radiation; a system electrical insulation layer configured to surround the system radiator layer, wherein the system electrical insulation layer comprises a system electrical insulation material configured to allow the delta radiation to penetrate therethrough; a system collector layer configured to surround the system electrical insulation layer, wherein the system collector layer comprises a system collector material configured to collect delta radiation; a system positive terminal connection electrically coupled to the system radiator layer; and a system negative terminal connection electrically coupled to the system collector layer.

The power generation system of, wherein the system radiator material comprises tungsten.

The power generation system of, wherein the system electrical insulation material comprises magnesium-oxide.

The power generation system of, further comprising a system thermal harvesting connection.

The power generation system of any of, further comprising the plurality of irradiators.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"): the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially" "about", or "approximately" means within 1, 2, 3, or 4 standard deviations. In certain embodiments, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. An irradiator-based power generation device comprising:

a radiator layer comprising a radiator material configured to emit delta radiation in response to exposure to gamma radiation, wherein the radiator layer is structured to slidably receive and at least partially surround an irradiator capsule comprising irradiated material configured to emit gamma radiation;

an electrical insulation layer surrounding the radiator layer, wherein the electrical insulation layer comprises an electrical insulation material that allows delta radiation to penetrate therethrough;

a collector layer surrounding the electrical insulation layer, wherein the collector layer comprises a collector material to collect delta radiation;

a positive terminal connection electrically coupled to the irradiator capsule, the radiator layer, or a combination thereof; and a negative terminal connection electrically coupled to the collector layer.

2. The power generation device of claim 1, further comprising the irradiator capsule.

3. The power generation device of claim 2, wherein the irradiator capsule comprises a depleted irradiator.

4. The power generation device of claim 2, wherein the irradiator capsule comprises cobalt-60, caesium-137, or a combination thereof.

5. The power generation device of claim 1, wherein the radiator material comprises tungsten.

6. The power generation device of claim 1, wherein the electrical insulation material comprises magnesium-oxide.

7. The power generation device of claim 1, further comprising a thermal harvesting connection.

8. An irradiator-based power generation system comprising:

a plurality of irradiator-based power generation devices, wherein each of the plurality of power generation devices comprises:

a device radiator layer comprising a device radiator material configured to emit delta radiation in response to exposure to gamma radiation, wherein the device radiator layer is structured to slidably receive and at least partially surround an irradiator capsule comprising irradiated material configured to emit gamma radiation;

a device electrical insulation layer surrounding the device radiator layer, wherein the device electrical insulation layer comprises a device electrical insulation material that allows delta radiation to penetrate therethrough;

a device collector layer surrounding the device electrical insulation layer, wherein the device collector layer comprises a device collector material to collect delta radiation;

a device positive terminal connection electrically coupled to the irradiator capsule, the device radiator layer, or a combination thereof; and a device negative terminal connection electrically coupled to the device collector layer;

a system positive terminal connection electrically coupled to each of the device positive terminal connections of the plurality of power generation devices; and a system negative terminal connection electrically coupled to each of the device negative terminal connections of the plurality of power generation devices.

9. The power generation system of claim 8, further comprising:

a system radiator layer at least partially surrounding the plurality of irradiator-based power generation devices, wherein the system radiator layer comprises a system radiator material configured to emit delta radiation in response to exposure to gamma radiation;

a system electrical insulation layer surrounding the system radiator layer, wherein the system electrical insulation layer comprises a system electrical insulation material that allows the delta radiation to penetrate therethrough;

a system collector layer surrounding the system electrical insulation layer, wherein the system collector layer comprises a system collector material to collect delta radiation, and wherein the system collector layer is electrically coupled to the system negative terminal connection.

10. The power generation system of claim 9, wherein the system radiator material comprises tungsten.

11. The power generation system of claim 9, wherein the system electrical insulation material comprises magnesium-oxide.

12. The power generation system of claim 9, further comprising a system thermal harvesting connection.

13. The power generation system of claim 8, wherein each of the plurality of power generation devices comprise the irradiator capsule.

14. The power generation system of claim 13, wherein the irradiator capsule comprises a depleted irradiator.

15. The power generation system of claim 13, wherein the irradiator capsule comprises cobalt-60, caesium-137, or a combination thereof.

16. An irradiator-based power generation system comprising:

a system radiator layer comprising a system radiator material configured to emit delta radiation in response to exposure to gamma radiation, wherein the system radiator layer is structured to slidably receive and at least partially surround a plurality of an irradiator capsules, and wherein each of the irradiator capsules comprise an irradiated material configured to emit gamma radiation;

a system electrical insulation layer surrounding the system radiator layer, wherein the system electrical insulation layer comprises a system electrical insulation material that allows the delta radiation to penetrate therethrough;

a system collector layer surrounding the system electrical insulation layer, wherein the system collector layer comprises a system collector material to collect delta radiation;

a system positive terminal connection electrically coupled to the system radiator layer; and a system negative terminal connection electrically coupled to the system collector layer.

17. The power generation system of claim 16, wherein the system radiator material comprises tungsten.

18. The power generation system of claim 16, wherein the system electrical insulation material comprises magnesium-oxide.

19. The power generation system of claim 16, further comprising a system thermal harvesting connection.

20. The power generation system of claim 16, further comprising the plurality of irradiator capsules.

* * * * *